United States Patent
Hill et al.

(10) Patent No.: US 9,873,415 B2
(45) Date of Patent: Jan. 23, 2018

(54) SYSTEM FOR PROVIDING SPEED-DEPENDENT CONTROL OF A BRAKE OF A HAULED UNIT OF A WORK VEHICLE AND RELATED VALVE ASSEMBLY

(71) Applicant: CNH Industrial America, LLC, New Holland, PA (US)

(72) Inventors: Christopher Hill, Chicago, IL (US); Jerry L. Brinkley, Woodridge, IL (US); Kenneth McCabe, Romeoville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/050,526

(22) Filed: Feb. 23, 2016

(65) Prior Publication Data
US 2017/0240151 A1    Aug. 24, 2017

(51) Int. Cl.
| | |
|---|---|
| *B60T 8/17* | (2006.01) |
| *B60T 11/28* | (2006.01) |
| *B60T 7/06* | (2006.01) |
| *B60T 11/10* | (2006.01) |
| *B62D 11/08* | (2006.01) |
| *B60T 11/21* | (2006.01) |

(52) U.S. Cl.
CPC .............. *B60T 8/1708* (2013.01); *B60T 7/06* (2013.01); *B60T 11/108* (2013.01); *B60T 11/21* (2013.01); *B60T 11/28* (2013.01); *B62D 11/08* (2013.01)

(58) Field of Classification Search
CPC ......... B60T 8/1708; B60T 11/08; B60T 11/20
USPC ....................................................... 303/123
See application file for complete search history.

(56) References Cited

U.S. PATENT DOCUMENTS

| | | | |
|---|---|---|---|
| 6,619,460 | B1 | 9/2003 | Carlsson et al. |
| 8,820,855 | B2 | 9/2014 | Cadaddu |
| 8,974,011 | B2 | 3/2015 | Schick et al. |
| 9,561,784 | B2 * | 2/2017 | Casali ..................... B60T 7/04 |
| 2008/0164113 | A1 * | 7/2008 | Cadeddu ................ B60T 11/20 |
| | | | 188/345 |

(Continued)

FOREIGN PATENT DOCUMENTS

| | | |
|---|---|---|
| SU | 1729857 | 4/1992 |
| WO | WO 2010/031722 | 3/2010 |

(Continued)

OTHER PUBLICATIONS

Copyright 2014 by ASME, 3 pages. http://proceedings.asmedigitalcollection.asme.org/proceedings.aspx.

*Primary Examiner* — Robert A Siconolfi
*Assistant Examiner* — San Aung
(74) *Attorney, Agent, or Firm* — Richard K. DeMille; Rebecca L. Henkel

(57) ABSTRACT

A system for controlling a brake of a unit hauled by a work vehicle may generally include a valve assembly. When a speed of the work vehicle exceeds a predetermined speed threshold, the valve assembly may be configured to allow the brake to be actuated when first and second brake pedals of the work vehicle are depressed, either individually or simultaneously. However, when the speed of the work vehicle is less than the predetermined speed threshold, the valve assembly may only be configured to allow the brake to be actuated when both of the first and second brake pedals are depressed simultaneously.

16 Claims, 5 Drawing Sheets

(56) References Cited

U.S. PATENT DOCUMENTS

| | | | | |
|---|---|---|---|---|
| 2009/0250997 A1* | 10/2009 | Mamei | ............... | B60T 11/21 |
| | | | | 303/117.1 |
| 2012/0062022 A1* | 3/2012 | Heren | ............... | B60T 11/21 |
| | | | | 303/2 |
| 2013/0127239 A1* | 5/2013 | Brenninger | ......... | B60T 11/21 |
| | | | | 303/9.61 |
| 2015/0059860 A1 | 3/2015 | Horton et al. | | |

FOREIGN PATENT DOCUMENTS

| WO | WO 2014/082693 | 6/2014 |
|---|---|---|
| WO | WO 2014/096156 | 6/2014 |
| WO | WO 2014/096159 | 6/2014 |

\* cited by examiner

SYSTEM FOR PROVIDING SPEED-DEPENDENT CONTROL OF A BRAKE OF A HAULED UNIT OF A WORK VEHICLE AND RELATED VALVE ASSEMBLY

FIELD OF THE INVENTION

The present subject matter relates generally to work vehicles and, more particularly, to a system for providing speed-dependent control of one or more brakes of a hauled unit of a work vehicle and a related valve assembly.

BACKGROUND OF THE INVENTION

A work vehicle, such as a tractor, typically includes two brake pedals, each of which is coupled to a corresponding brake cylinder or service brake for braking an associated wheel of the vehicle. For instance, the work vehicle may include a left brake pedal hydraulically connected to a left service brake for braking the left rear wheel of the vehicle and a right brake pedal hydraulically connected to a right service brake for braking the right rear wheel of the vehicle. In addition to the service brakes, the work vehicle may also include or be associated with additional brakes, such as one or more trailer brakes of a trailer or other unit being hauled by the vehicle.

In most conventional braking systems, the trailer brake(s) is coupled to the same hydraulic circuit as the service brake(s) to allow the trailer brake(s) to be actuated via depression of the brake pedal(s). As such, in instances when an operator depresses one of the brake pedals (e.g., the left brake pedal), the associated service brake (e.g., the left service brake) is actuated in combination with the trailer brake(s). Such simultaneous actuation of the trailer brake(s) with the service brake(s) may be advantageous when the work vehicle is travelling at relatively high speeds (e.g., when traveling along a road). However, when the work vehicle is traveling at relatively low speeds (e.g., when working in a field), it is often desirable to be able to steer the work vehicle by actuating one of the service brakes without actuating the trailer brake(s). Unfortunately, conventional braking systems do not provide for this functionality.

To address this lack of functionality, recent attempts have been made to allow for speed-based control of the trailer brake(s). For instance, international publication WO 2014/096156, entitled "A Brake System for Controlling a Brake of a Unit Hauled by a Vehicle" and assigned to CNH Industrial Italia SPA, discloses a braking system that utilizes an inverse shuttle valve in combination with a solenoid valve to provide speed-dependent control of one or more trailer brake(s). While this braking system represents a significant improvement over conventional systems, a need continues to exist for further refinements and improvements of existing braking systems to provide a cost-effective and efficient solution for providing speed-dependent control of the trailer brake(s) associated with a work vehicle.

Accordingly, an improved system and a related valve assembly for providing speed-dependent control of one or more trailer brakes of a hauled unit of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling a brake of a unit hauled by a work vehicle. The system may include a first brake pedal provided in operative association with a first input line and a second brake pedal provided in operative association with a second input line. The system may also include a primary supply line provided in fluid communication with the first and second input lines and a secondary supply line provided in fluid communication with the first input line. In addition, the system may include a control valve provided between an output line and the primary and secondary supply lines. The control valve may be movable between a first position, wherein the output line is in fluid communication with the primary supply line, and a second position, wherein the output line is in fluid communication with the secondary supply line. Moreover, the system may include a secondary valve provided in operative association with the secondary supply line. The secondary valve may be configured to allow fluid to flow through the secondary supply line from the first input line to the control valve only when the second brake pedal is depressed. When a speed of the work vehicle is greater than a predetermined speed threshold, the control valve may be configured to be moved to the first position such that pressurized fluid is supplied to the output line from the primary supply line for actuating the brake of the unit hauled by the work vehicle when either the first brake pedal or the second brake pedal is depressed. Further, when the speed of the work vehicle is less than the predetermined speed threshold, the control valve may be configured to be moved to the second position such that pressurized fluid is supplied to the output line from the secondary supply line for actuating the brake of the unit hauled by the work vehicle only when both of the first and second brake pedals are depressed.

In another aspect, the present subject matter is directed to a valve assembly for controlling the actuation of a brake of a unit hauled by a work vehicle, wherein the work vehicle includes a first brake pedal and a second brake pedal. The valve assembly may include a primary supply line provided in fluid communication with both a first input line associated with the first brake pedal and a second input line associated with the second brake pedal and a secondary supply line provided in fluid communication with the first input line. The valve assembly may also include a control valve provided between an output line and the primary and secondary supply lines. The control valve may be movable between a first position, wherein the output line is in fluid communication with the primary supply line, and a second position, wherein the output line is in fluid communication with the secondary supply line. In addition, the valve assembly may include a pilot-operated check valve provided in operative association with the secondary supply line. The pilot-operated check valve may be configured to be actuated from a closed position to an opened position to provide a flow path through the secondary supply line from the first input line to the control valve. When either the first brake pedal or the second brake pedal is depressed, the pilot-operated check valve is maintained in the closed position such that pressurized fluid is directed to the control valve solely through the primary supply line. Moreover, when both the first and second brake pedals are depressed, the pilot-operated check valve is actuated to the opened position such that pressurized fluid is directed through the secondary supply line to the control valve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
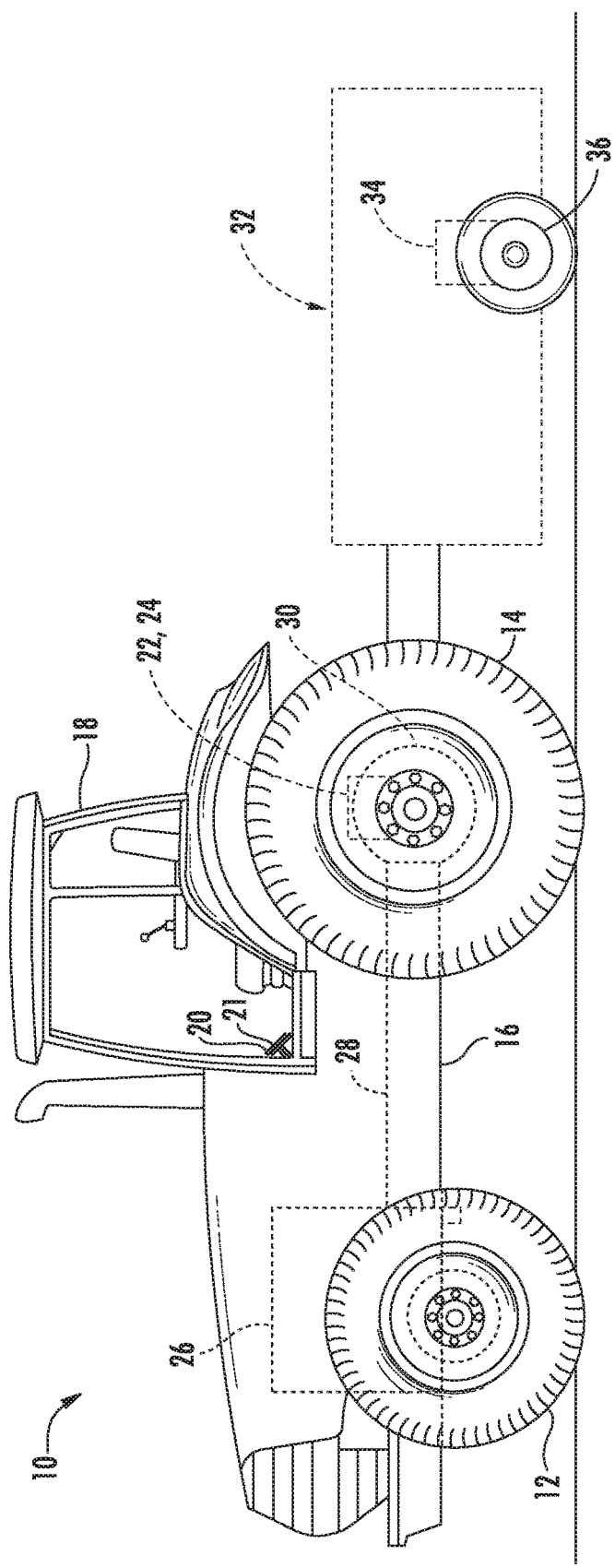
FIG. 1 illustrates a side view of one embodiment of a work vehicle hauling or towing a given unit, such as a trailer, in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a related valve assembly for providing speed dependent control of one or more trailer brakes of a hauled unit of a work vehicle. Specifically, in several embodiments, the valve assembly may utilize a pilot-operated check valve in combination with a control valve to regulate the flow of pressurized hydraulic fluid being supplied to a trailer brake valve of the hauled unit upon the depression of one or both of the vehicle's brake pedals. For example, as will be described below, the valve assembly may allow for the trailer brake(s) to be actuated when: 1) both brake pedals are depressed, regardless of the vehicle's speed; or 2) a single brake pedal is depressed and the current speed of the vehicle exceeds a predetermined speed threshold. However, when the vehicle's speed is less than the predetermined speed threshold, the valve assembly will not actuate the trailer brake(s) when a single brake pedal is depressed, thereby allowing the operator to independently actuate the service brakes at low vehicle speeds to provide preferred operation of the work vehicle.

It should be appreciated that, although the present subject matter is generally described herein with reference braking systems using hydraulic fluid, the disclosed system and method may generally utilize any suitable braking fluid. For instance, in an alternative embodiment, the disclosed system and method may be configured as a pneumatically actuated braking system that utilizes air as the braking fluid.

Referring now to the drawings, FIG. 1 illustrates a side view of one embodiment of a work vehicle 10 in accordance with aspects of the present subject matter. As shown, the work vehicle 10 is configured as an agricultural tractor. However, in other embodiments, the work vehicle 10 may be configured as any other suitable work vehicle known in the art, such as various other agricultural vehicles and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices (e.g., levers, pedals, control panels and/or the like) for permitting an operator to control the operation of the work vehicle 10. For example, a first brake pedal 20 may be provided within the cab 18 for actuating a first service brake 22 configured to brake the left rear wheel 14 of the work vehicle 10. Additionally, a second brake pedal 21 may be provided within the cab 18 for actuating a second service brake 24 configured to brake the right rear wheel 14 of the work vehicle 10.

Moreover, the work vehicle 10 may include an engine 26 and a transmission 28 mounted on the chassis 16. The transmission 28 may be operably coupled to the engine 26 and may provide variably adjusted gear ratios for transferring engine power to the wheels 14 via a differential 30. The engine 26, transmission 28, and differential 30 may collectively define a drive train of the work vehicle 10.

As shown in FIG. 1, in several embodiments, the work vehicle 10 may be configured to haul or tow a suitable trailer (indicated by dashed box 32). In general, the trailer 32 may correspond to any suitable unit that may be hauled or towed by the vehicle 10, including, but not limited to, towed units intended to carry a load and equipment or implements capable of performing a desired operation or function, such as ground handling equipment, fertilizer spreaders, sprayers and/or the like. As shown in FIG. 1, the trailer 32 may include one or more trailer brakes 34 configured for braking one or more associated wheels 36 of the trailer 32.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 26, transmission 28, and differential 30 are coupled, a configuration common in smaller tractors. Still other configurations may use an articulated chassis to steer the work vehicle 10, or rely on tracks in lieu of tires.

Figure 2:
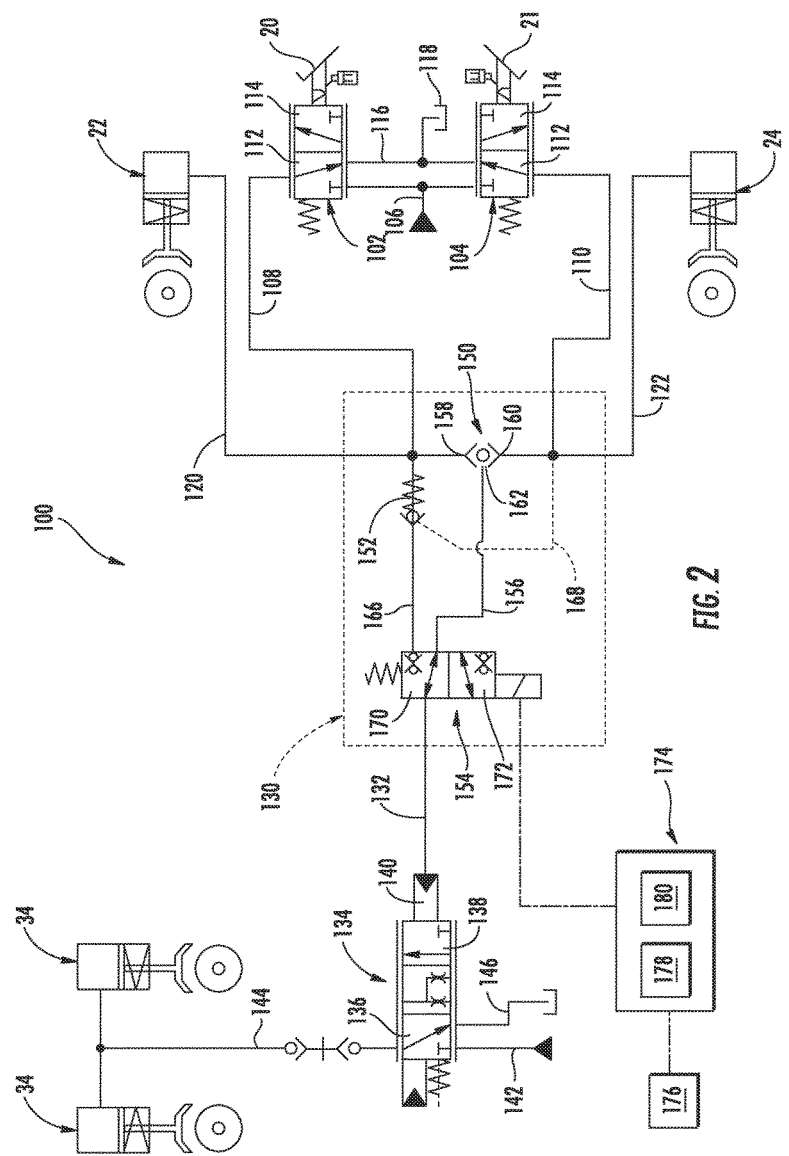
FIG. 2 illustrates a schematic view of one embodiment of a system for providing speed-dependent control of one or more brakes of a unit hauled by a work vehicle in accordance with aspects of the present subject matter.

Referring now to FIG. 2, a schematic view of one embodiment of a system 100 for providing speed-dependent control of one or more brakes of a unit hauled by a work vehicle is illustrated in accordance with aspects of the present subject matter. In general, the system 100 will be described herein with reference to the work vehicle 10 and the trailer 32 described above with reference to FIG. 1. However, it should be appreciated that, in general, the system 100 may be utilized with any suitable work vehicle and/or any suitable unit configured to be towed or hauled by a work vehicle.

As shown in FIG. 2, the disclosed system 100 may generally relate to a speed-dependent hydraulic braking arrangement for selectively actuating the trailer brake(s) 34 of the trailer 32 when one or more of the brake pedals 20, 21 of the work vehicle 10 are being depressed by the operator. Specifically, as will be described in greater detail below, when the ground speed of the work vehicle 10 is above a given speed threshold, the trailer brake(s) 34 may be actuated regardless of whether the operator depresses both of the brake pedals 20, 21 or only one of the brake pedals 20, 21. However, when the ground speed of the work vehicle 10 is below the speed threshold, the trailer brake(s) 34 may only be actuated when the operator depresses both brake pedals 20, 21 simultaneously. As such, at low vehicle speeds, the operator may depress one of the brake pedals 20, 21 to actuate its associated service brake 22, 24 without actuating the trailer brake(s) 34.

As shown in the illustrated embodiment, each brake pedal 20, 21 of the work vehicle 10 may be coupled to a corresponding pedal valve 102, 104 for controlling the flow of hydraulic fluid from a pressurized fluid source 106 to a respective input line 108, 110 of the system 100. Specifically, the first brake pedal 20 may be provided in operative association with a first pedal valve 102 that controls the flow of hydraulic fluid between the pressurized fluid source 106 and a first input line 108. Similarly, the second brake pedal 21 may be provided in operative association with a second pedal valve 104 that controls the flow of hydraulic fluid between the pressurized fluid source 106 and a second input line 110. Additionally, each pedal valve 102, 104 may be configured to be actuated from a return position (indicated schematically in FIG. 2 by box 112) to a supply position (indicated schematically in FIG. 2 by box 114) when its corresponding brake pedal 20, 21 is depressed to provide a flow path between the pressurized fluid source 106 and the associated input line 108, 110. For example, when the first brake pedal 20 is depressed, the first pedal valve 102 may be actuated to its supply position 114, thereby allowing pressurized hydraulic fluid to be supplied from the fluid source 106 to the first input line 108. Similarly, when the second brake pedal 21 is depressed, the second pedal valve 104 may be actuated to its supply position 114, thereby allowing pressurized hydraulic fluid to be supplied from the fluid source 106 to the second input line 110. Additionally, when each pedal valve 102, 104 is in the return position 112 (e.g., when its associated brake pedal 20, 21 not being depressed), the valve 102, 104 may provide a flow path between its corresponding input line 108, 110 and a suitable return line 116 for draining hydraulic fluid back to a suitable fluid container or tank 118.

As shown in FIG. 2, the first and second service brakes 22, 24 may be provided in fluid communication with the first and second input lines 108, 110, respectively, of the system 100. Specifically, the first service brake 22 may be provided in fluid communication with the first input line 108 via a first brake line 120. As such, when the first brake pedal 20 is depressed and pressurized hydraulic fluid is supplied through the first input line 108, a portion of the fluid may be directed through the first brake line 120 to actuate the first service brake 22. Similarly, the second service brake 24 may be provided in fluid communication with the second input line 110 via a second brake line 122. As such, when the second brake pedal 21 is depressed and pressurized hydraulic fluid is supplied through the second input line 110, a portion of the fluid may be directed through the second brake line 122 to actuate the second service brake 24.

Additionally, as shown in FIG. 2, the system 100 may include a valve assembly (indicated by dashed line 130) provided in fluid communication between the first and second input lines 108, 110 and an output line 132 for controlling the flow of hydraulic fluid to a trailer brake valve 134 configured to control the actuation of the trailer brake(s) 34. Specifically, in several embodiments, the output line 132 from the valve assembly 130 may serve as a pilot line for actuating the trailer brake valve 134 from a return position (indicated schematically in FIG. 2 by box 136) to a supply position (indicated schematically in FIG. 2 by box 136), thereby allowing for the trailer brake(s) 34 to be actuated. For example, when pressurized hydraulic fluid is supplied through the output line 132 to a pilot actuator 140 associated with the trailer brake valve 134, the valve 134 may be actuated to its supply position 138, thereby providing a flow path between a suitable pressurized fluid source 142 (e.g., the same or a different fluid source as the pressurized fluid source 106 described above) and a trailer brake line 144 in fluid communication with the trailer brakes 34. However, when the supply of pressurized fluid through the output line 132 is cut-off, the trailer brake valve 134 may be actuated back to its return position 136, thereby allowing the hydraulic fluid within the trailer brakes 34 to be returned via the trailer brake line 144 to a suitable return line 146. Thus, by regulating the supply of pressurized fluid from the first and second input lines 108, 110 to the output line 132, the valve assembly 130 may be used to control the actuation of the trailer brakes 34 in response to the depression of one or both of the brake pedals 20, 21.

As shown in FIG. 2, in several embodiments, the valve assembly 130 may include a shuttle valve 150, a pilot-operated check valve 152 and a control valve 154 for controlling the flow of hydraulic fluid from the first and second input lines 108, 110 to the output line 132. Specifically, the shuttle valve 150 may be provided in fluid communication between the first and second input lines 108, 110 and a primary supply line 156 extending between the shuttle valve 150 and the control valve 154. For example, as shown in the illustrated embodiment, the shuttle valve 150 may include a first input port 158 to which the first input line 108 is connected, a second input port 160 to which the second input line 110 is connected, and an output port 162 to which the primary supply line 156 is connected. In addition, the shuttle valve 150 may include a ball or other valve element that is configured to be displaced between the input ports 158, 160 based on the pressure of the fluid within the first and second input lines 108, 110. In such an embodiment, when the fluid pressure within the one of the input lines 108, 110 is greater than the fluid pressure within the other input line 108, 110, the valve element may be actuated in a manner that closes off the input port 158, 160 associated with the input line 108, 110 having the lower fluid pressure, thereby allowing the input line 108, 110 with the greater fluid pressure to be in fluid communication with the primary supply line 156. In contrast, when the fluid pressure within the first and second input lines 108, 110 is the same or substantially the same, the valve element may remain in a central position to allow both input lines 108, 110 to be fluid communication with the primary supply line 156.

Additionally, as shown in FIG. 2, the pilot-operated check valve 152 may be provided in operative association with a secondary supply line 166 extending between the first input line 108 (e.g., at a location upstream of the shuttle valve 150) and the control valve 154. In general, the pilot-operated check valve 152 may be configured to regulate the supply of hydraulic fluid through the secondary supply line 166 based on the pressure of the fluid being supplied through the second input line 110. Specifically, as shown in FIG. 2, a pilot line 168 may be provided that is fluidly coupled between the second input line 110 and the pilot-operated check valve 152. As such, when the second brake pedal 21 is depressed and pressurized hydraulic fluid is supplied through the second input line 110, a portion of the pressurized fluid may be directed through the pilot line 168 to the check valve 152, thereby opening the valve 152 and providing a flow path along the secondary supply line 166 for fluid flowing between the first input line 108 the control valve 154. However, when the supply of pressurized fluid through the second input line 110 is cut-off (e.g., when the second brake pedal 21 is released), the check valve 152 may be returned to a closed position, thereby preventing the flow of hydraulic fluid through the secondary supply line 166.

Referring still to FIG. 2, the control valve 154 of the valve assembly 130 may be provided in fluid communication with the primary and secondary supply lines 156, 166 for selectively controlling the supply of hydraulic fluid from the supply lines 156, 166 to the output line 132. Specifically, in several embodiments, the control valve 154 may correspond to a 3-way/2-position, electronically controlled valve, such as a solenoid-activated valve. As such, the control valve 154 may be automatically actuated between a first position (indicated schematically in FIG. 2 by box 170) and a second position (indicated schematically in FIG. 2 by box 172) to control the supply of pressurized hydraulic fluid to the output line 132. Specifically, in the first position 170, the control valve 154 may provide a flow path between the primary supply line 156 and the output line 132 whereas, in the second position 172, the control valve 154 may provide a flow path between the secondary supply line 166 and the output line 132.

It should be appreciated that, in several embodiments, the various components/lines of the valve assembly 130, such as the shuttle valve 150, the pilot-operated check valve 152, and the control valve 154 as well as the associated supply lines 156, 166, may be incorporated into or otherwise form part of a common valve or valve block. For instance, the shuttle valve 150 and pilot-operated check valve 152 may be configured as valve cartridges configured to be received within a common valve block.

To actuate the control valve 154 between the first and second positions 170, 172, the system 100 may also include a controller 174 coupled to the valve 154. As will be described in greater detail below, the controller 174 may, in several embodiments, be configured to control the operation of the control valve 154 based on the current ground speed of the work vehicle 10. Specifically, the controller 174 may be configured to monitor the vehicle's speed (e.g., via a suitable speed sensor 176) and compare the monitored speed to a predetermined speed threshold. If the monitored ground speed exceeds the predetermined speed threshold, the controller 174 may be configured to actuate the control valve 154 to the first position 170 (e.g., by deactivating the solenoid), thereby providing a flow path between the primary supply line 156 and the output line 132. However, if the monitored ground speed is less than the predetermined speed threshold, the controller 174 may be configured to actuate the control valve 154 to the second position 172 (e.g., by activating the solenoid), thereby providing a flow path between the secondary supply line 166 and the output line 132.

It should be appreciated that the controller 174 may generally correspond to any suitable processor-based device known in the art, such as any suitable computing device and/or any combination of computing devices. Thus, in several embodiments, the controller 174 may include one or more processor(s) 178 and associated memory device(s) 180 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 180 of the controller 174 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 180 may generally be configured to store suitable computer-readable instructions that, when executed by the processor(s) 178, configure the controller 174 to perform various computer-implemented functions, such as the methods and operations described herein. In addition, the controller 174 may also include various other suitable components, such as a communications circuit or module, one or more input/output channels, a data/control bus and/or the like.

It should also be appreciated that the controller 174 may correspond to an existing controller of the work vehicle 10 or the controller 174 may correspond to a separate processing device. For instance, in one embodiment, the controller 174 may form all or part of a separate plug-in module that may be installed within the work vehicle 10 to allow for the disclosed system 100 to be implemented without requiring additional software to be uploaded onto existing control device(s) of the vehicle 10.

Additionally, it should be appreciated that the speed sensor 176 may generally correspond to any suitable sensor or sensing device configured to transmit signals to the controller 174 that provide an indication of the ground speed of the work vehicle 10. For instance, in one embodiment, the speed sensor 176 may correspond to a GPS device configured to monitor the vehicle's speed. In another embodiment, the speed sensor 176 may correspond to a sensor configured to monitor the output speed of the engine 26. In such an embodiment, by knowing the current output speed of the engine 26 as well as the current gear ratio of the transmission 28, the controller 174 may be configured to calculate the current vehicle speed. In further embodiments, the speed sensor 176 may correspond to any other suitable sensor or sensing device that allows the controller 174 to directly or indirectly monitor the ground speed of the work vehicle 10.

Figure 3:
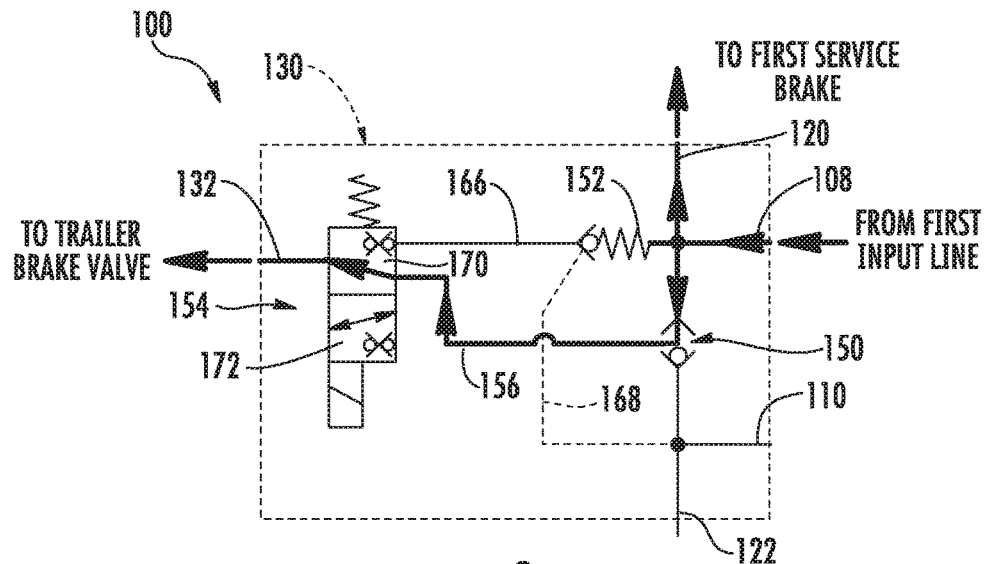
FIG. 3 illustrates a schematic view of the valve assembly of the system shown in FIG. 2, particularly illustrating the flow of pressurized hydraulic fluid through the valve assembly when the speed of the work vehicle exceeds a predetermined speed threshold and a first brake pedal of the work vehicle is being depressed.
Figure 4:
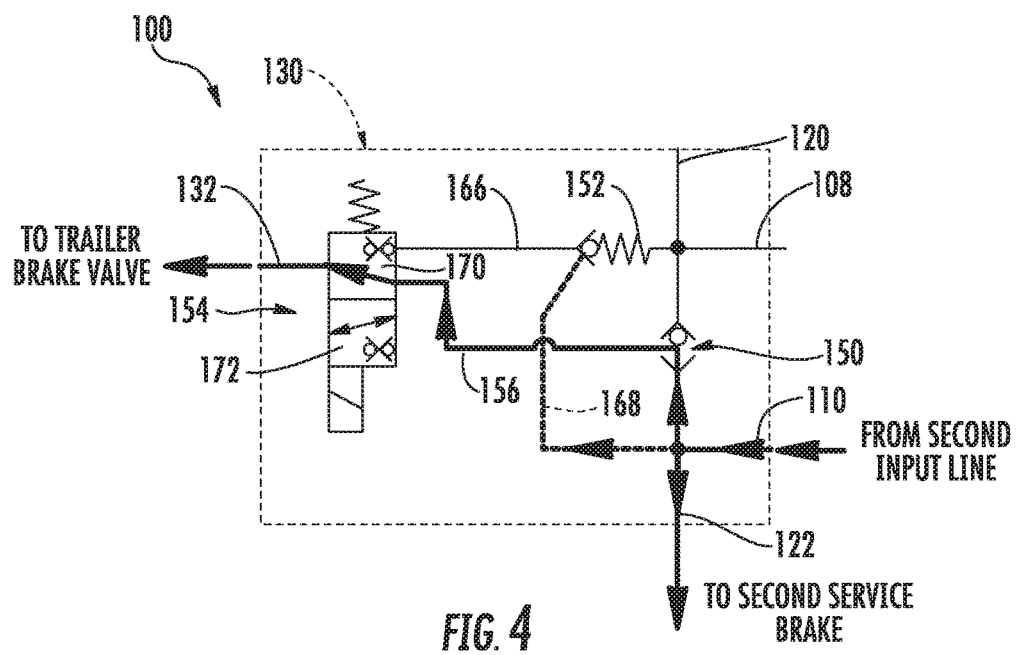
FIG. 4 illustrates another schematic view of the valve assembly of the system shown in FIG. 2, particularly illustrating the flow of pressurized hydraulic fluid through the valve assembly when the speed of the work vehicle exceeds the predetermined speed threshold and a second brake pedal of the work vehicle is being depressed.
Figure 5:
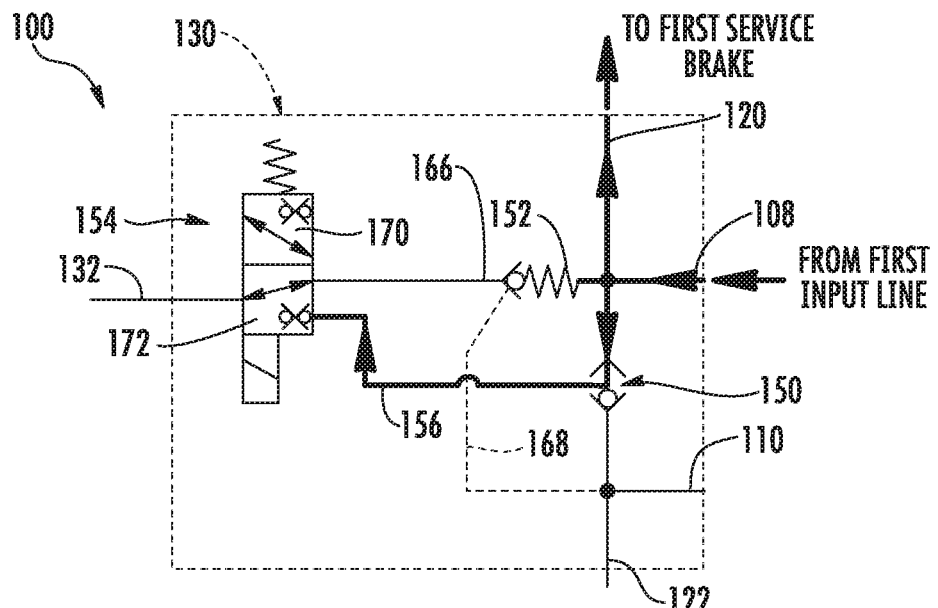
FIG. 5 illustrates a further schematic view of the valve assembly of the system shown in FIG. 2, particularly illustrating the flow of pressurized hydraulic fluid through the valve assembly when the speed of the work vehicle is less than the predetermined speed threshold and the first brake pedal of the work vehicle is being depressed.
Figure 6:
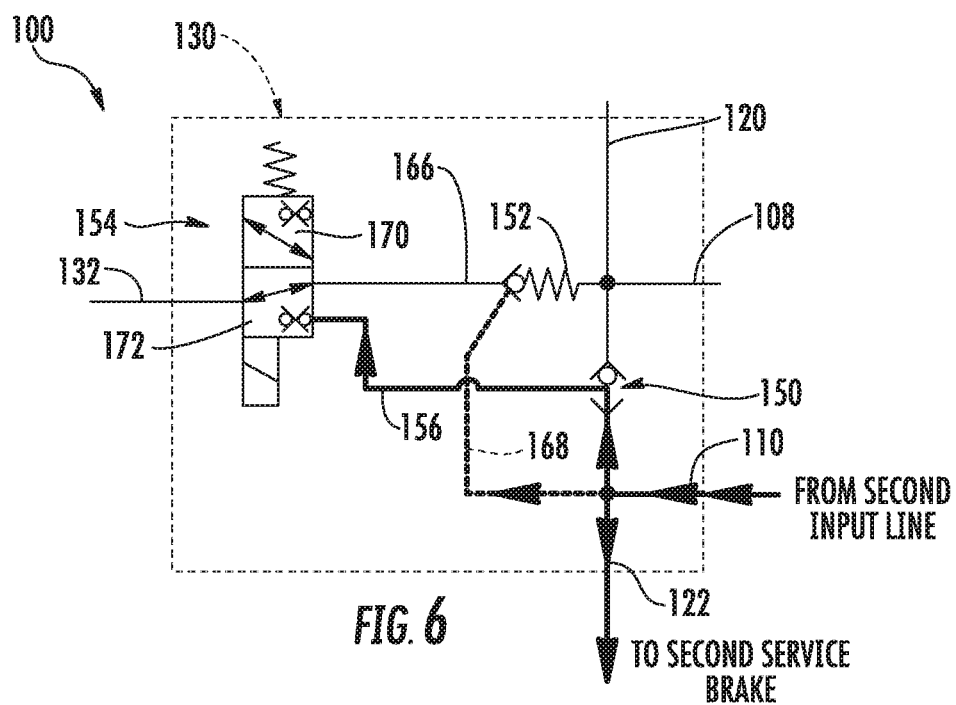
FIG. 6 illustrates yet another schematic view of the valve assembly of the system shown in FIG. 2, particularly illustrating the flow of pressurized hydraulic fluid through the valve assembly when the speed of the work vehicle is less than the predetermined speed threshold and the second brake pedal of the work vehicle is being depressed.
Figure 7:
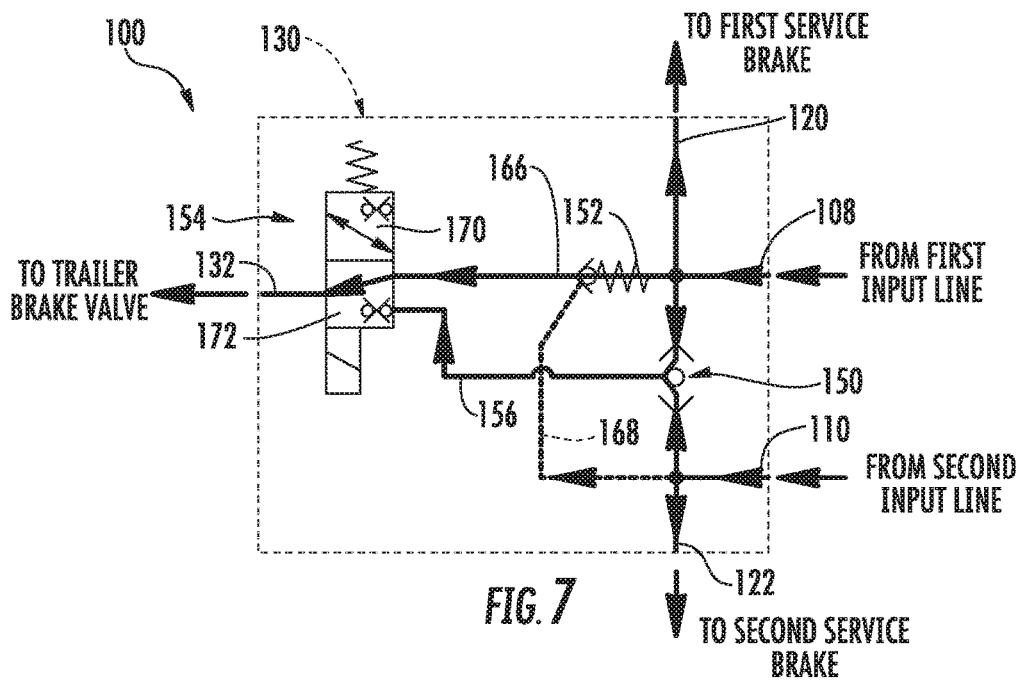
FIG. 7 illustrates another schematic view of the valve assembly of the system shown in FIG. 2, particularly illustrating the flow of pressurized hydraulic fluid through the valve assembly when the speed of the work vehicle is less than the predetermined speed threshold and both the first and second brake pedals of the work vehicle are being depressed.
Figure 8:
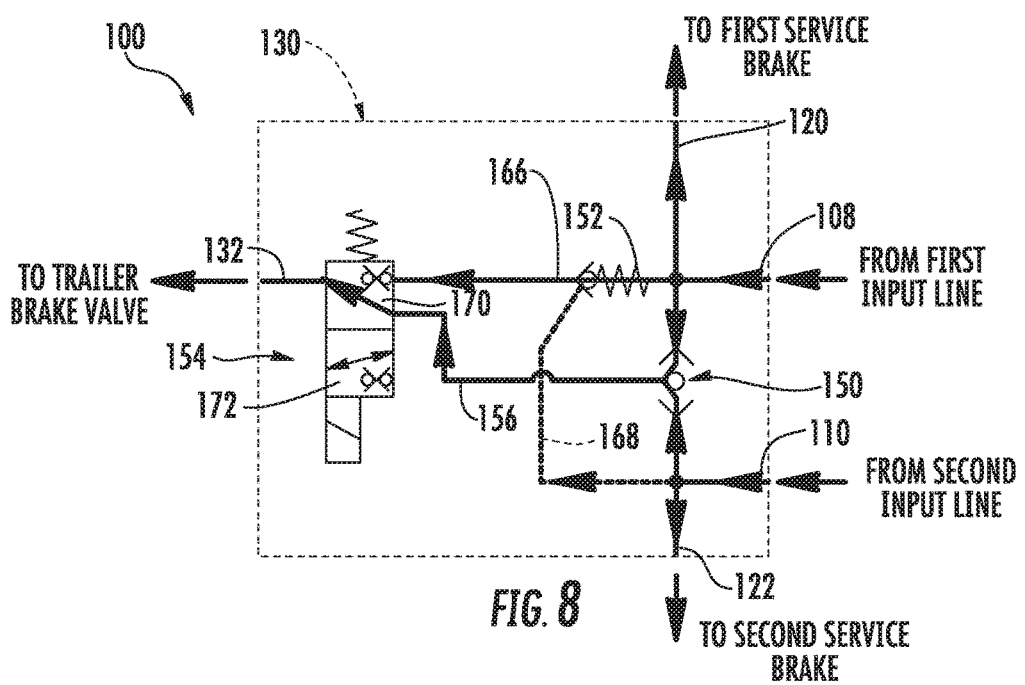
FIG. 8 illustrates a further schematic view of the valve assembly of the system shown in FIG. 2, particularly illustrating the flow of pressurized hydraulic fluid through the valve assembly when the speed of the work vehicle exceeds the predetermined speed threshold and both the first and second brake pedals of the work vehicle are being depressed.

Referring now to FIGS. 3-8, the operation of the system 100 shown in FIG. 2 will generally be described with reference to the flow of pressurized hydraulic fluid (indicated by the bolded lines in FIGS. 3-8) through the valve assembly 130 that occurs depending on: 1) whether one or both of the brake pedals 20, 21 have been depressed; and 2) whether the ground speed of the work vehicle 10 exceeds the predetermined speed threshold set for actuating the control valve 154. Specifically, FIGS. 3 and 4 illustrate the flow of pressurized hydraulic fluid through the valve assembly 130 when the ground speed of the work vehicle 10 exceeds the predetermined speed threshold and only one of the brake pedals 20, 21 has been depressed, with FIG. 3 showing the flow of hydraulic fluid when the first brake pedal 20 is depressed and FIG. 4 showing the flow of hydraulic fluid when the second brake pedal 21 is depressed. In contrast, FIGS. 5 and 6 illustrate the flow of pressurized hydraulic fluid through the valve assembly 130 when the ground speed of the work vehicle 10 is less than the predetermined speed threshold and only one of the brake pedals 20, 21 has been depressed, with FIG. 5 showing the flow of hydraulic fluid when the first brake pedal 20 is depressed and FIG. 6 showing the flow of hydraulic fluid when the second brake pedal 21 is depressed. Additionally, FIGS. 7 and 8 illustrate the flow of pressurized hydraulic fluid through the valve assembly 130 when both of the brake pedals 20, 21 have been depressed, with FIG. 7 showing the flow of hydraulic fluid when the ground speed of the work vehicle 10 is less than the predetermined speed threshold and FIG. 8 showing the flow of hydraulic fluid when the ground speed of the work vehicle 10 exceeds the predetermined speed threshold.

As shown in FIGS. 3 and 4, when the ground speed of the work vehicle 10 exceeds the predetermined speed threshold, the control valve 154 may be actuated to its first position 170 (e.g., via the controller 174) so as to provide a flow path between the primary supply line 156 and the output line 132. As such, regardless of which brake pedal 20, 21 is depressed, a flow of pressurized hydraulic fluid may be supplied to the output line 132 via the primary supply line 156 to allow the trailer brake(s) 34 to be actuated. For instance, as shown in FIG. 3, when the first brake pedal 20 is depressed, pressurized hydraulic fluid may be supplied to the valve assembly 130 via the first input line 108. A portion of the pressurized fluid flowing through the first input line 108 may be diverted through the first brake line 120 to actuate the first service brake 22 while another portion of the pressurized fluid may be directed through the shuttle valve 150 and into the primary supply line 156. The pressurized fluid directed through the primary supply line 156 may then flow through the control valve 154 to the output line 132 for subsequent delivery to the pilot actuator 140 of the trailer brake valve 134.

Similarly, as shown in FIG. 4, when the second brake pedal 21 is depressed, pressurized hydraulic fluid may be supplied to the valve assembly 130 via the second input line 110. A portion of the pressurized fluid flowing through the second input line 110 may be diverted through the second brake line 122 to actuate the second service brake 24 while another portion of the pressurized fluid may be directed through the shuttle valve 150 and into the primary supply line 156. The pressurized fluid directed through the primary supply line 156 may then flow through the control valve 154 to the output line 132 for subsequent delivery to the pilot actuator 140 of the trailer brake valve 134.

It should be appreciated that, based on the system operation shown in FIGS. 3 and 4, the trailer brakes 34 will be actuated when the ground speed of the work vehicle 10 exceeds the predetermined speed threshold regardless of which individual brake pedal 20, 21 is being depressed by the operator. Such system operation may provide for a safe and efficient reduction of the ground speed of the work vehicle 10 upon depression of one of the brake pedals 20, 21.

Moreover, as shown in FIGS. 5 and 6, when the ground speed of the work vehicle 10 is less than predetermined speed threshold, the control valve 154 may be actuated to its second position 172 (e.g., via the controller 184) so as to provide a flow path between the secondary supply line 166 and the output line 132 (and to also cut-off the flow path between the primary supply line 156 and the output line 132). As such, when only a single brake pedal 20, 21 is depressed, the flow of pressurized fluid through the valve assembly 130 may be cut-off at the control valve 154, thereby preventing actuation of the trailer brake(s) 34. For instance, as shown in FIG. 5, when the first brake pedal 20 is depressed, pressurized hydraulic fluid may be supplied to the valve assembly 130 via the first input line 108. A portion of the pressurized fluid flowing through the first input line 108 may be diverted through the first brake line 120 to actuate the first service brake 22 while another portion of the pressurized fluid may be directed through the shuttle valve 150 and into the primary supply line 156. However, as shown in FIG. 5, given the positioning of the control valve 154, the pressurized fluid directed through the primary supply line 156 from the first input line 108 may be prevented from flowing flow through the control valve 150 to the output line 132.

Similarly, as shown in FIG. 6, when the second brake pedal 21 is depressed, pressurized hydraulic fluid may be supplied to the valve assembly 130 via the second input line 110. A portion of the pressurized fluid flowing through the second input line 110 may be diverted through the second brake line 122 to actuate the second service brake 24 while another portion of the pressurized fluid may be directed through the shuttle valve 150 and into the primary supply line 156. However, as shown in FIG. 6, given the positioning of the control valve 154, the pressurized fluid directed through the primary supply line 156 from the second input line 110 may be prevented from flowing flow through the control valve 150 to the output line 132. Additionally, as shown in FIG. 6, a further portion of the pressurized fluid flowing through the second input line 110 may be diverted through the pilot line 168 in order to actuate the pilot-operated check valve 152 to its opened position. However, since the first brake pedal 20 is not depressed, no pressurized fluid is being supplied through the first input line 108.

It should be appreciated that, based on the system operation shown in FIGS. 5 and 6, the trailer brakes 34 will not be actuated when the ground speed of the work vehicle 10 is less than the predetermined speed threshold regardless of which individual brake pedal 20, 21 is being depressed by the operator. Such system operation may allow for the operator to use each brake pedal 20, 21 independently to provide controlled steering of the work vehicle 10 at reduced ground speeds.

Moreover, as shown in FIGS. 7 and 8, when both of the brake pedals 20, 21 are depressed, the trailer brake(s) 34 may be actuated regardless of the ground speed of the work vehicle 10. For instance, as shown in FIG. 7, the control valve 154 been actuated to its second position 172, thereby indicating that the ground speed of the work vehicle 10 is less than predetermined speed threshold. In such instance, when both brake pedals 20, 21 are depressed, pressurized hydraulic fluid may be supplied to the valve assembly 130 via the first and second input lines 108, 110. A portion of the pressurized fluid flowing through the first input line 108 may be diverted through the first brake line 120 to actuate the first service brake 22 while another portion of the pressurized fluid may be directed through the shuttle valve 150 and into the primary supply line 156. Similarly, a portion of the pressurized fluid flowing through the second input line 110 may be diverted through the second brake line 122 to actuate the second service brake 24 while another portion of the pressurized fluid may be directed through the shuttle valve 150 and into the primary supply line 156. Additionally, as shown in FIG. 7, a further portion of the pressurized fluid flowing through the second input line 110 may be diverted through the pilot line 168 in order to actuate the pilot-operated check valve 152 to its opened position, thereby allowing a portion of the pressurized fluid flowing through the first input line 108 to be diverted through the secondary supply line 166. The pressurized fluid directed through the secondary supply line 166 may then flow through the control valve 154 to the output line 132 for subsequent delivery to the pilot actuator 140 of the trailer brake valve 134.

Similarly, as shown in FIG. 8, the control valve 154 has been actuated to its first position 170, thereby indicating that the ground speed of the work vehicle 10 is greater than predetermined speed threshold. In such instance, when both brake pedals 20, 21 are depressed, pressurized hydraulic fluid may be supplied to the valve assembly 130 via the first and second input lines 108, 110. A portion of the pressurized fluid flowing through the first input line 108 may be diverted through the first brake line 120 to actuate the first service brake 122 while another portion of the pressurized fluid may be directed through the shuttle valve 150 and into the primary supply line 156. Similarly, a portion of the pressurized fluid flowing through the second input line 110 may be diverted through the second brake line 122 to actuate the second service brake 24 while another portion of the pressurized fluid may be directed through the shuttle valve 150 and into the primary supply line 156. The pressurized fluid directed through the primary supply line 156 may then flow through the control valve 154 to the output line 132 for subsequent delivery to the pilot actuator 140 of the trailer brake valve 134. Additionally, as shown in FIG. 8, a further portion of the pressurized fluid flowing through the second input line 110 may be diverted through the pilot line 168 in order to actuate the pilot-operated check valve 152 to its opened position. However, given the positioning of the control valve 154, the pressurized fluid diverted through the secondary supply line 166 may be stopped at the control valve 134.

It should be appreciated that, based on the system operation shown in FIGS. 7 and 8, the trailer brakes 34 will always be actuated when both brake pedals 20,21 are depressed regardless of the ground speed of the work vehicle 10. Such system operation may provide a consistent means for actuating the trailer brakes 34 without reference to the vehicle's speed.

It should also be appreciated that the predetermined speed threshold described herein may generally correspond to any suitable vehicle speed at which it is desired to adjust the operation of the system 100 as described above. However, in a particular embodiment of the present subject matter, the predetermined speed threshold may correspond to a vehicle speed ranging from about 8 kilometers per hour (KPH) to about 16 KPH, such as from about 10 KPH to about 14 KPH or from about 11 KPH to about 13 KPH and any other subranges therebetween.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling a brake of a unit hauled by a work vehicle, the system comprising:
    a first brake pedal provided in operative association with a first input line;
    a second brake pedal provided in operative association with a second input line;
    a primary supply line provided in fluid communication with the first and second input lines;
    a secondary supply line provided in fluid communication with the first input line;
    a control valve provided between an output line and the primary and secondary supply lines, the control valve movable between a first position, wherein the output line is in fluid communication with the primary supply line, and a second position, wherein the output line is in fluid communication with the secondary supply line;
    a secondary valve provided in operative association with the secondary supply line, the secondary valve configured to allow fluid to flow through the secondary supply line from the first input line to the control valve only when the second brake pedal is depressed, wherein the secondary valve corresponds to a pilot-operated check valve; and
    a pilot line fluidly coupled between the second input line and the secondary valve,
    wherein, when a speed of the work vehicle is greater than a predetermined speed threshold, the control valve is moved to the first position such that pressurized fluid is supplied to the output line from the primary supply line for actuating the brake of the unit hauled by the work vehicle when either the first brake pedal or the second brake pedal is depressed,
    wherein, when the speed of the work vehicle is less than the predetermined speed threshold, the control valve is moved to the second position such that pressurized fluid is supplied to the output line from the secondary supply line for actuating the brake of the unit hauled by the work vehicle only when both of the first and second brake pedals are depressed,
    wherein, when the second brake pedal is depressed, the pressurized fluid is supplied through the pilot line to actuate the secondary valve from a closed position to an opened position, and
    wherein, when the second brake pedal is released, the secondary valve is returned to the closed position to prevent fluid from flowing through the secondary supply line to the control valve.

2. A system for controlling a brake of a unit hauled by a work vehicle, the system comprising:
   a first brake pedal provided in operative association with a first input line;
   a second brake pedal provided in operative association with a second input line;
   a primary supply line provided in fluid communication with the first and second input lines;
   a secondary supply line provided in fluid communication with the first input line;
   a control valve provided between an output line and the primary and secondary supply lines, the control valve movable between a first position, wherein the output line is in fluid communication with the primary supply line, and a second position, wherein the output line is in fluid communication with the secondary supply line;
   a secondary valve provided in operative association with the secondary supply line, the secondary valve configured to allow fluid to flow through the secondary supply line from the first input line to the control valve only when the second brake pedal is depressed; and
   a brake valve in fluid communication with the output line, wherein the output line is fluidly coupled to a pilot actuator of the brake valve,
   wherein, when a speed of the work vehicle is greater than a predetermined speed threshold, the control valve is moved to the first position such that pressurized fluid is supplied to the output line from the primary supply line for actuating the brake of the unit hauled by the work vehicle when either the first brake pedal or the second brake pedal is depressed,
   wherein, when the speed of the work vehicle is less than the predetermined speed threshold, the control valve is moved to the second position such that pressurized fluid is supplied to the output line from the secondary supply line for actuating the brake of the unit hauled by the work vehicle only when both of the first and second brake pedals are depressed, and
   wherein the brake valve is configured to actuate the brake of the unit hauled by the work vehicle when the pressurized fluid is supplied from the control valve through the output line.

3. The system of claim 1, wherein the control valve corresponds to an electronically controlled valve, further comprising a controller coupled to the control valve that is configured to actuate the control valve between the first and second positions based on the speed of the work vehicle.

4. The system of claim 3, wherein the controller is configured to monitor the speed of the work vehicle based on signals received from a speed sensor.

5. The system of claim 1, further comprising a shuttle valve provided between the primary supply line and the first and second input lines.

6. The system of claim 5, wherein the secondary supply line is fluidly coupled to the first supply line upstream of the shuttle valve.

7. The system of claim 1, wherein the first input line is provided in fluid communication with a first service brake of the work vehicle.

8. The system of claim 1, wherein the second input line is provided in fluid communication with a second service brake of the work vehicle.

9. A valve assembly for controlling the actuation of a brake of a unit hauled by a work vehicle, the work vehicle including a first brake pedal and a second brake pedal, the valve assembly comprising:
   a primary supply line provided in fluid communication with both a first input line associated with the first brake pedal and a second input line associated with the second brake pedal;
   a secondary supply line provided in fluid communication with the first input line;
   a control valve provided between an output line and the primary and secondary supply lines, the control valve movable between a first position, wherein the output line is in fluid communication with the primary supply line, and a second position, wherein the output line is in fluid communication with the secondary supply line; and
   a pilot-operated check valve provided in operative association with the secondary supply line, the pilot-operated check valve configured to be actuated from a closed position to an opened position to provide a flow path through the secondary supply line from the first input line to the control valve,
   wherein, when either the first brake pedal or the second brake pedal is depressed, the pilot-operated check valve is maintained in the closed position such that pressurized fluid is directed to the control valve solely through the primary supply line,
   wherein, when both the first and second brake pedals are depressed, the pilot-operated check valve is actuated to the opened position such that pressurized fluid is directed through the secondary supply line to the control valve.

10. The valve assembly of claim 9, further comprising a pilot line fluidly coupled between the pilot-operated check valve and the second input line such that pressurized fluid is directed through the pilot line to actuate the pilot-operated check valve to the opened position when the second brake pedal is depressed.

11. The valve assembly of claim 10, wherein, when the second brake pedal is released, the pilot-operated check valve is returned to the closed position to prevent fluid from flowing through the secondary supply line to the control valve.

12. The valve assembly of claim 9, wherein the control valve comprises an electronically controlled valve.

13. The valve assembly of claim 9, wherein the control valve is configured to be actuated to the first position when a speed of the work vehicle is greater than a predetermined speed threshold.

14. The valve assembly of claim 9, wherein the control valve is configured to be actuated to the second position when a speed of the work vehicle is less than a predetermined speed threshold.

15. The valve assembly of claim 9, further comprising a shuttle valve provided between the primary supply line and the first and second input lines.

16. The valve assembly of claim 15, wherein the secondary supply line is fluidly coupled to the first supply line upstream of the shuttle valve.

* * * * *